(12) United States Patent
Crim (10) Patent No.: US 10,906,468 B1
(45) Date of Patent: Feb. 2, 2021

(54) SWIVELING DROP LADDER FOR VEHICLE TAILGATE

(71) Applicant: Ralph Crim, Battle Creek, MI (US)

(72) Inventor: Ralph Crim, Battle Creek, MI (US)

( * ) Notice: Subject to any disclaimer, the term of this patent is extended or adjusted under 35 U.S.C. 154(b) by 0 days.

(21) Appl. No.: 16/872,586

(22) Filed: May 12, 2020

Related U.S. Application Data (60) Provisional application No. 62/852,405, filed on May 24, 2019.

(51) Int. Cl.
*B60R 3/02* (2006.01)
*B60N 3/02* (2006.01)
*B62D 33/027* (2006.01)

(52) U.S. Cl.
CPC ............... *B60R 3/02* (2013.01); *B60N 3/023* (2013.01); *B62D 33/0273* (2013.01)

(58) Field of Classification Search
CPC ............ B60R 3/002; B60R 3/02; B60R 3/005
See application file for complete search history.

(56) References Cited

U.S. PATENT DOCUMENTS

| | | | |
|---|---|---|---|
| 3,545,567 A * | 12/1970 | Dohrman | E04F 11/06 182/97 |
| 3,735,838 A * | 5/1973 | Greenleaf | E06C 1/397 182/15 |
| 3,912,298 A * | 10/1975 | Humphrey | B60R 3/02 280/166 |
| 4,848,821 A | 7/1989 | Llewellyn | |
| 5,205,603 A | 4/1993 | Burdette, Jr. | |
| 7,080,713 B1 * | 7/2006 | Riggs | B60R 3/02 182/127 |
| 7,401,798 B2 | 7/2008 | Dolan | |
| 2010/0230209 A1 * | 9/2010 | Hughes | E06C 7/48 182/106 |

OTHER PUBLICATIONS

Norther Tool + Equipment, Traxion Tailgate Ladder, Model# 1-00040, the webpage is found at: https://www.northerntool.com, Nov. 4, 2019.
Westin, Westin® 10-3000-Truck-Pal™ Tailgate Ladder, the webpage is found at: https://www.carid.com, Apr. 11, 2019.

* cited by examiner

*Primary Examiner* — John D Walters
*Assistant Examiner* — James J Triggs
(74) *Attorney, Agent, or Firm* — Gardner, Linn, Burkhart & Ondersma LLP (57) ABSTRACT

A swiveling drop ladder configured for mounting to a vehicle tailgate includes a ladder and a swiveling plate. The ladder and the swiveling plate are coupled together via a hinge assembly. The swiveling plate, when mounted on a vehicle tailgate, is configured to provide for a rotation of the ladder from a stowed position upon the vehicle tailgate to a deployed position. The ladder extends off the back of the vehicle tailgate when in the deployed position. The hinge assembly is configured to provide for a rotation of the ladder when in the deployed position, such that the ladder extending off the vehicle tailgate angles down to touch the ground.

20 Claims, 9 Drawing Sheets

SWIVELING DROP LADDER FOR VEHICLE TAILGATE

CROSS REFERENCE TO RELATED APPLICATIONS

This application claims the filing benefits of U.S. provisional application Ser. No. 62/852,405, filed May 24, 2019, which is hereby incorporated herein by reference in its entirety.

FIELD OF THE INVENTION

The present invention is directed to ladders for vehicle tailgates.

BACKGROUND OF THE INVENTION

Conventional trucks, such as pickup trucks and other similar vehicles, are often equipped with an open cargo area, typically referred to as a "bed." This bed often includes sides and a tailgate configured to swing down for easy access to the cargo area of the bed from the rear of the vehicle. The bed of a conventional truck may be used for transporting any manner of cargo, limited only by size and cargo capacity of the particular vehicle. While the open cargo bed of a conventional pickup may allow for easy access to store or later retrieve cargo from the vehicle's bed, a typical vehicle bed is set to a height that can make it difficult for users to physically climb into and enter the vehicle bed.

SUMMARY OF THE INVENTION

An exemplary swiveling drop ladder of the present invention is configured for mounting to a vehicle tailgate. The swiveling drop ladder includes a ladder and a swiveling plate. The ladder and the swiveling plate are coupled together via a hinge assembly that is formed between the swiveling plate and the ladder. The swiveling plate, when mounted on a vehicle tailgate, is configured to provide for a first rotation of the ladder from a stowed position upon the vehicle tailgate to a deployed position. The ladder extends off the back of the vehicle tailgate when in the deployed position. The hinge assembly is configured to provide for a second rotation of the ladder when in the deployed position, such that the ladder in extending off the vehicle tailgate also angles down to touch the ground.

In an aspect of the present invention, the ladder is retained upon an interior surface of the vehicle tailgate when in the stowed position. The swiveling drop ladder may further include a retaining bracket configured to aid in retaining the ladder in the stowed position.

In a further aspect of the present invention, the swiveling plate is mounted to the vehicle tailgate via an opening in the swiveling plate. The first rotation of the swiveling plate rotates the swiveling plate about an axis at the opening. The opening is an elongated opening configured to provide for a longitudinal movement of the swiveling plate.

In another aspect of the present invention, the hinge assembly comprises a first portion affixed to the ladder and a second portion formed from a part of the swiveling plate. The first portion of the hinge assembly and the second portion of the hinge assembly are rotationally joined together via a hinge, such that the hinge assembly is configured to provide for the second rotation of the ladder.

In a further aspect of the present invention, the second portion of the hinge assembly, when in the deployed position, rests upon the surface of the vehicle tailgate and is aligned with an edge of the vehicle tailgate. The first portion of the hinge assembly, when in the deployed position, rotates about the hinge, such that the ladder rotates about the hinge and angles downward to touch the ground.

In a further embodiment, the hinge of the hinge assembly is a butt hinge. Optionally, the hinge may include one or more hinges. Additionally, the ladder may include a pair of rails with one or more hand rails attached thereto.

In another embodiment, a distal end of the ladder includes a pair of wheels. The wheels are configured to roll upon the ground when the ladder contacts the ground, such that the ladder slides along the ground in response to changing heights between the vehicle tailgate and the ground.

In an aspect of the present invention, the ladder, the swiveling plate, and the hinge assembly are formed of at least one of aluminum, reinforced polymeric material, and combinations thereof.

These and other objects, advantages, purposes and features of the present invention will become apparent upon review of the following specification in conjunction with the drawings.

DETAILED DESCRIPTION

Figure 1:
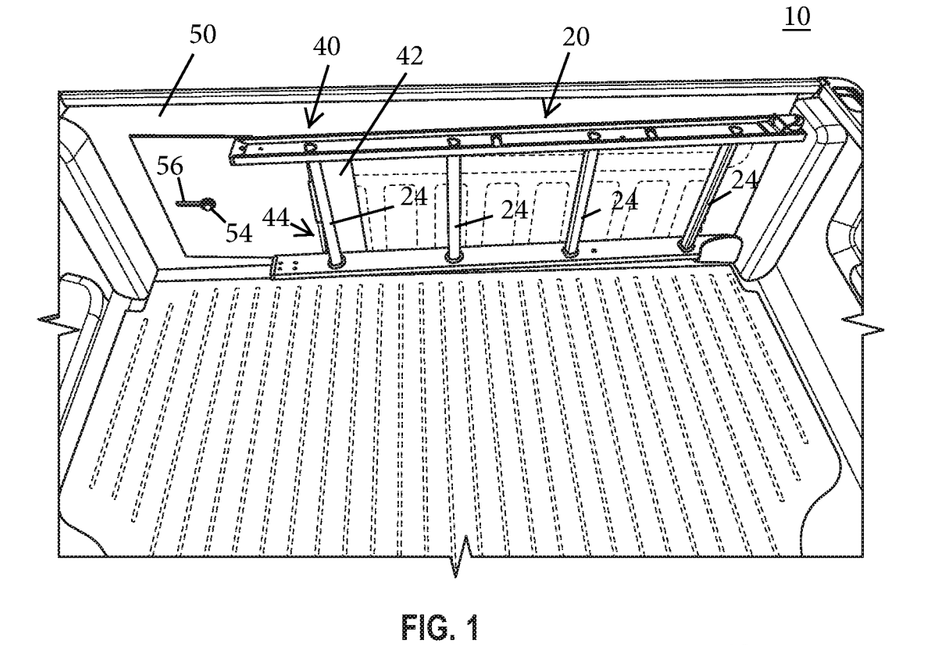
FIG. 1 is a perspective view of a swiveling drop ladder in a stowed position upon a closed tailgate in accordance with an embodiment of the present invention.
Figure 2:
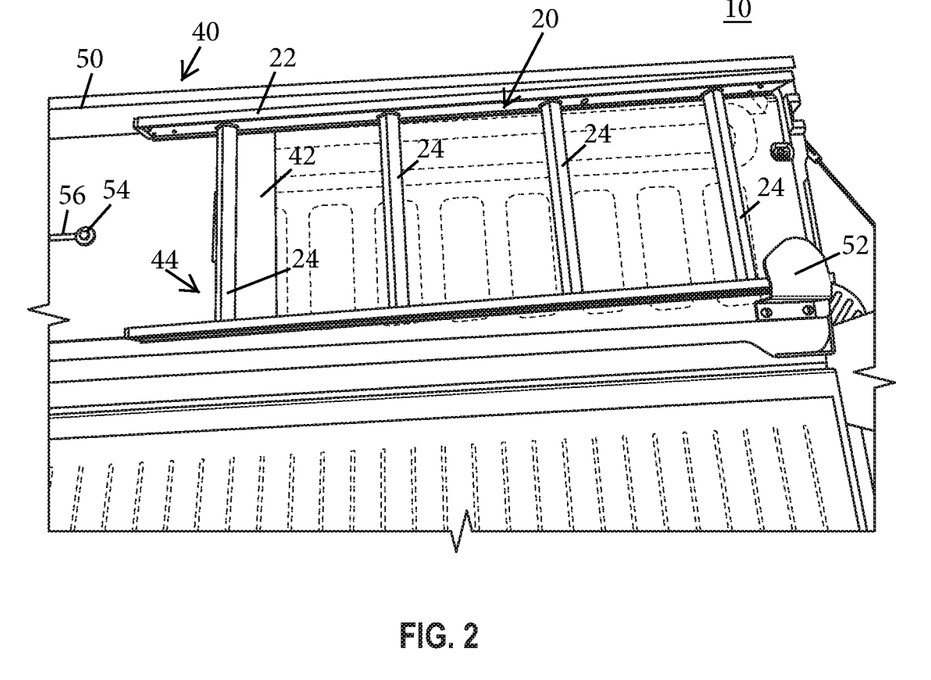
FIG. 2 is a perspective view of the swiveling drop ladder of FIG. 1 in a stowed position upon an open tailgate in accordance with an embodiment of the present invention.
Figure 3:
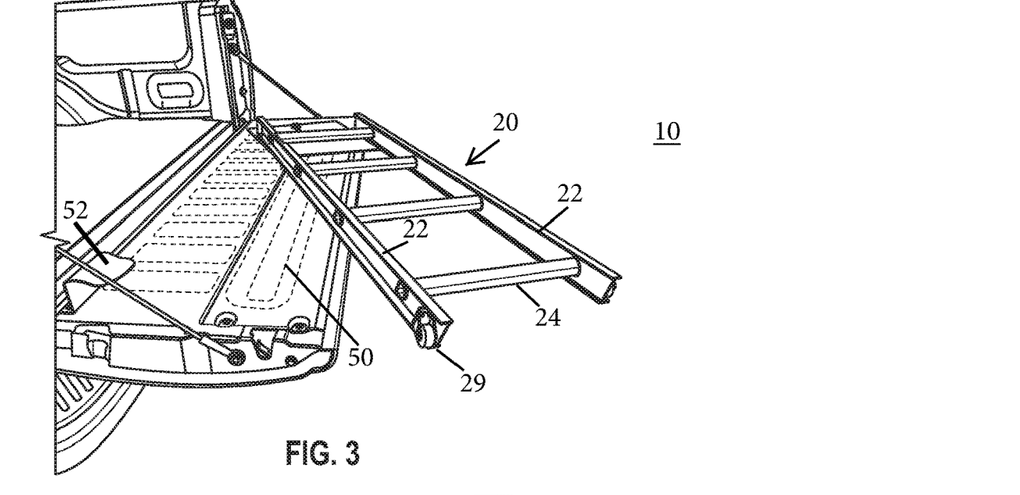
FIG. 3 is a left-side perspective view of the swiveling drop ladder of FIG. 1 in a partially deployed position upon an open tailgate in accordance with an embodiment of the present invention.
Figure 4:
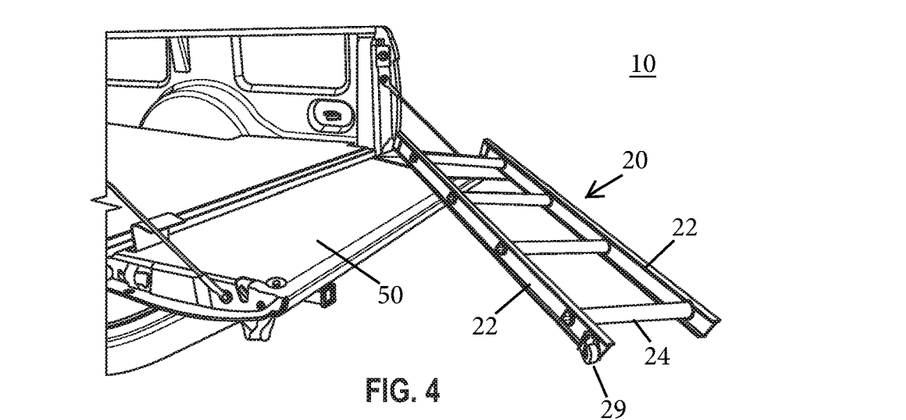
FIG. 4 is a left-side perspective view of the swiveling drop ladder of FIG. 1 in another partially deployed position upon an open tailgate in accordance with an embodiment of the present invention.
Figure 5:
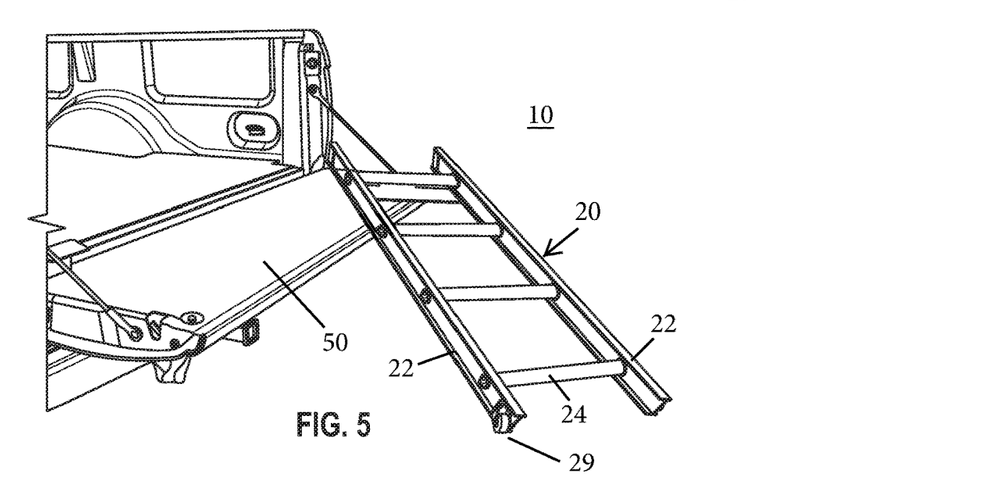
FIG. 5 is a left-side perspective view of the swiveling drop ladder of FIG. 1 in yet another partially deployed position upon an open tailgate in accordance with an embodiment of the present invention.
Figure 6:
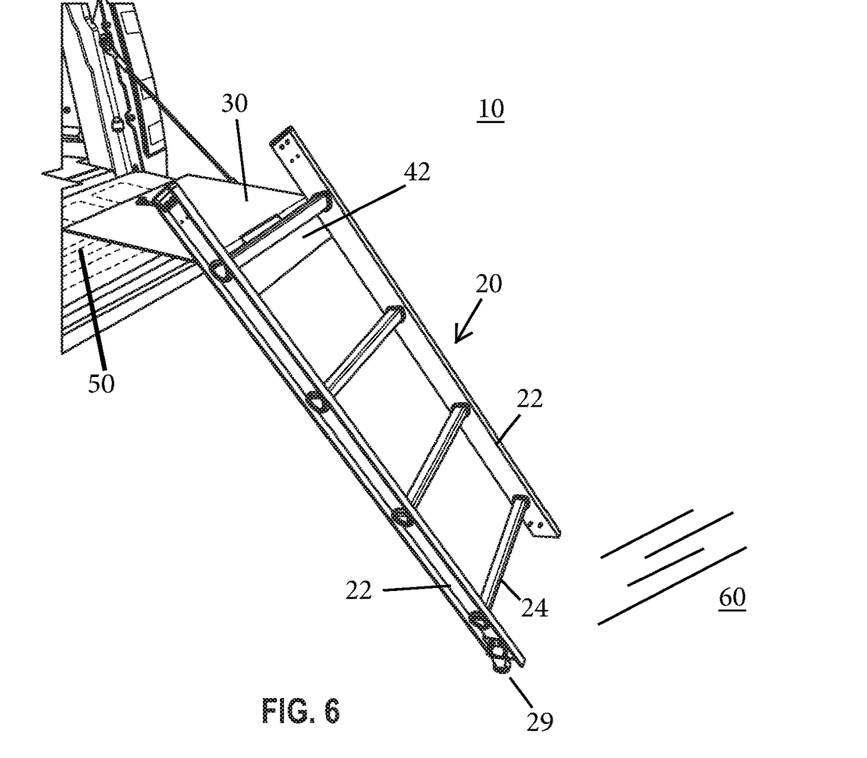
FIG. 6 is a left-side view of the swiveling drop ladder in a deployed position and extending off the tailgate to contact the ground in accordance with an embodiment of the present invention.
Figure 7:
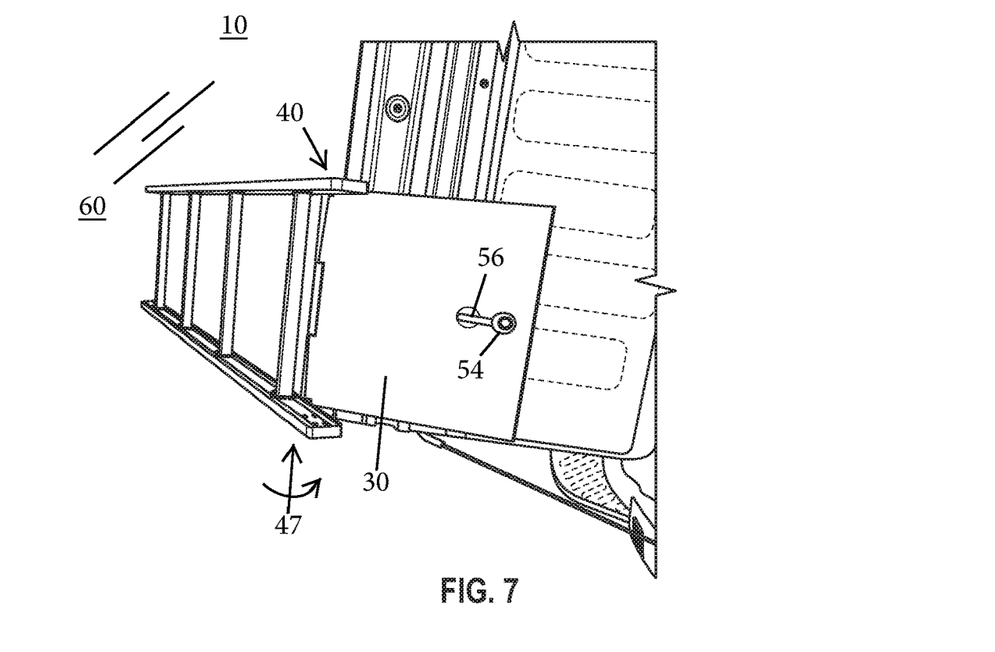
FIG. 7 is a top-down view of the swiveling drop ladder in a deployed position and extending off the tailgate to contact the ground in accordance with an embodiment of the present invention.
Figure 8:
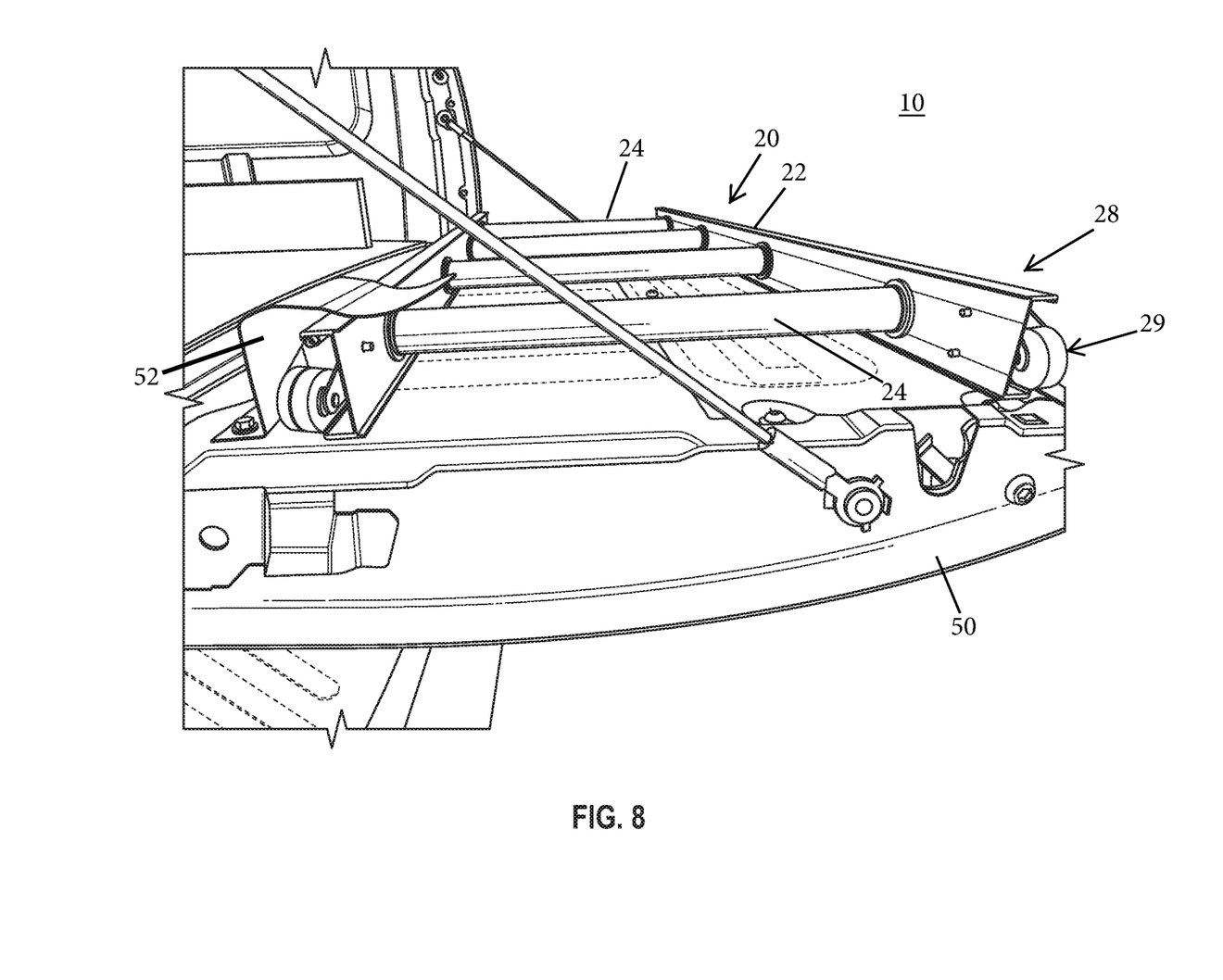
FIG. 8 is a left-side perspective view of the swiveling drop ladder of FIG. 1 and retained in a stowed position via a retainer on the open tailgate in accordance with an embodiment of the present invention.
Figure 10:
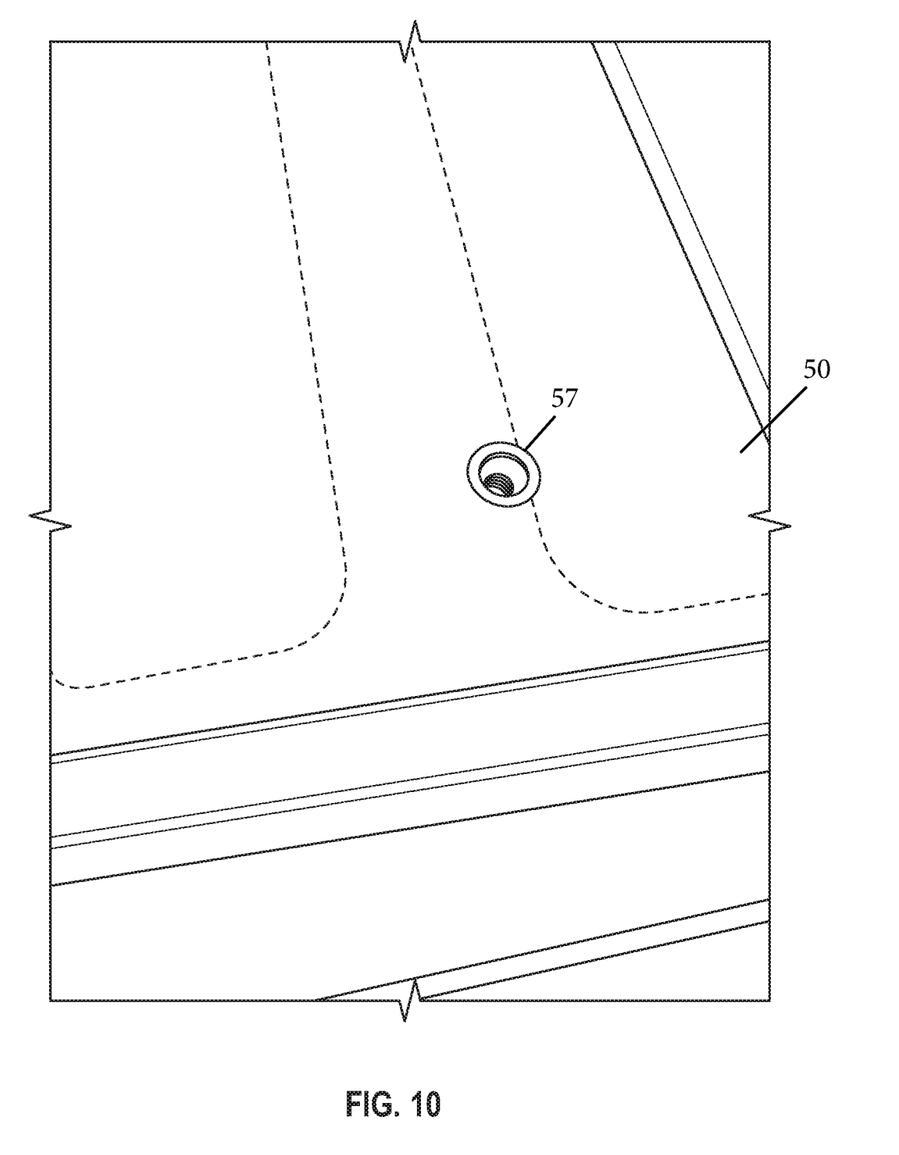
FIG. 10 is a top-down view of a threaded opening in the open tailgate for securing the swiveling drop ladder of FIG. 1 to the tailgate in accordance with an embodiment of the present invention.
Figure 11:
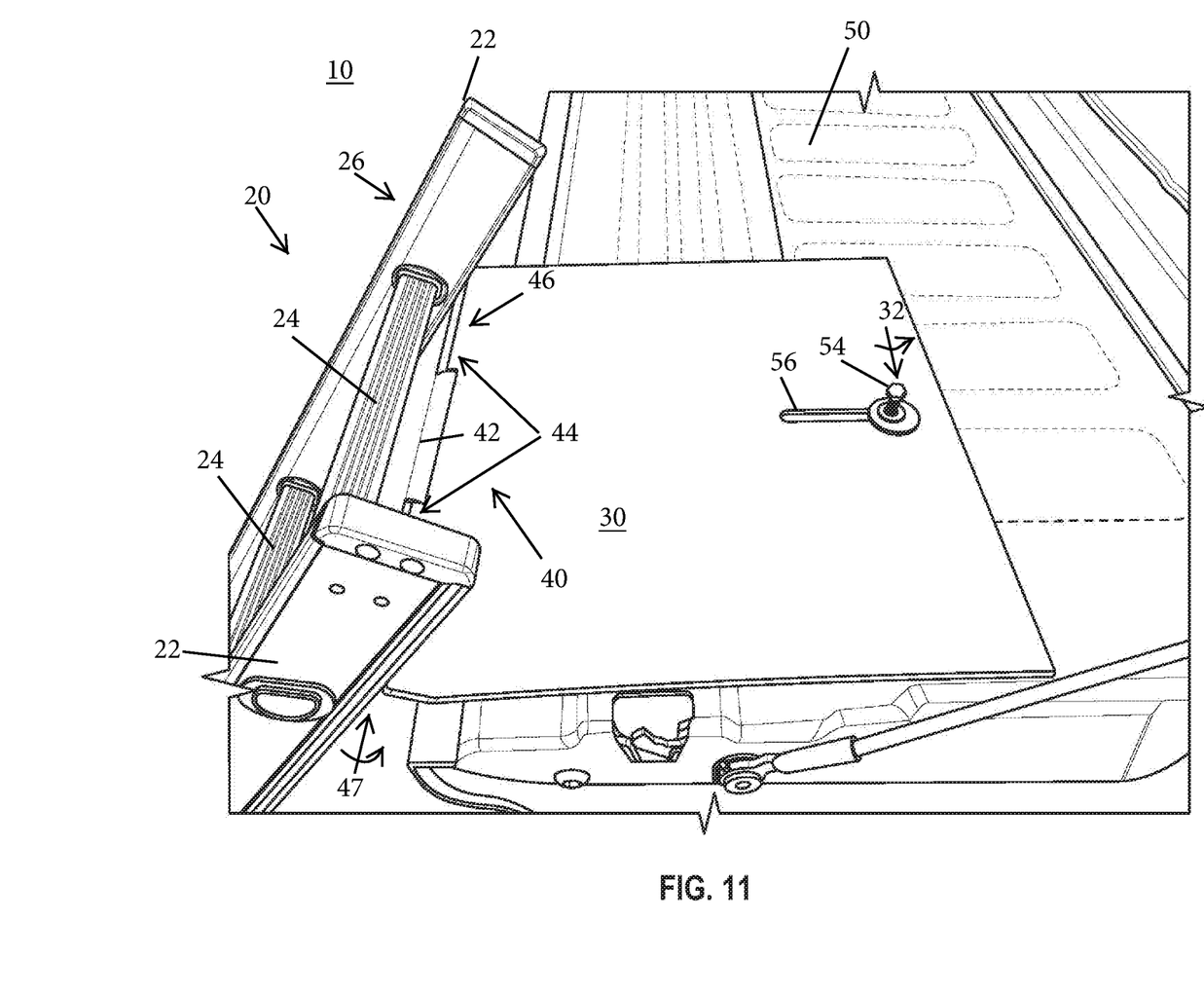
FIG. 11 is a right-side view of a swiveling plate of the swiveling drop ladder of FIG. 1 secured to the open tailgate via a bolt inserted through a slot in the swiveling plate and into the threaded opening of FIG. 10 in accordance with an embodiment of the present invention.
Figure 12:
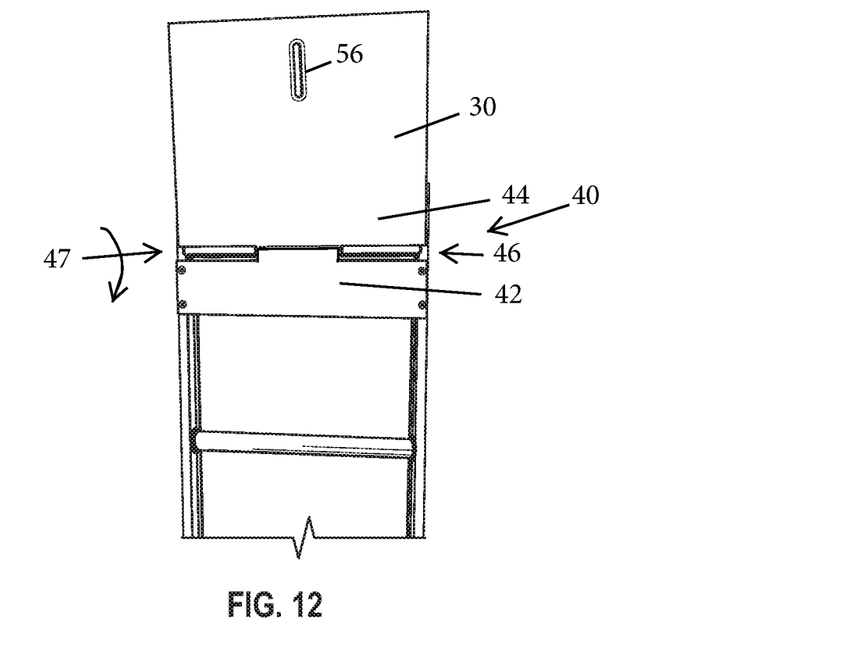
FIG. 12 is a back-side view of the swiveling drop ladder of FIG. 1 in a vertical orientation in accordance with an embodiment of the present invention.
Figure 13:
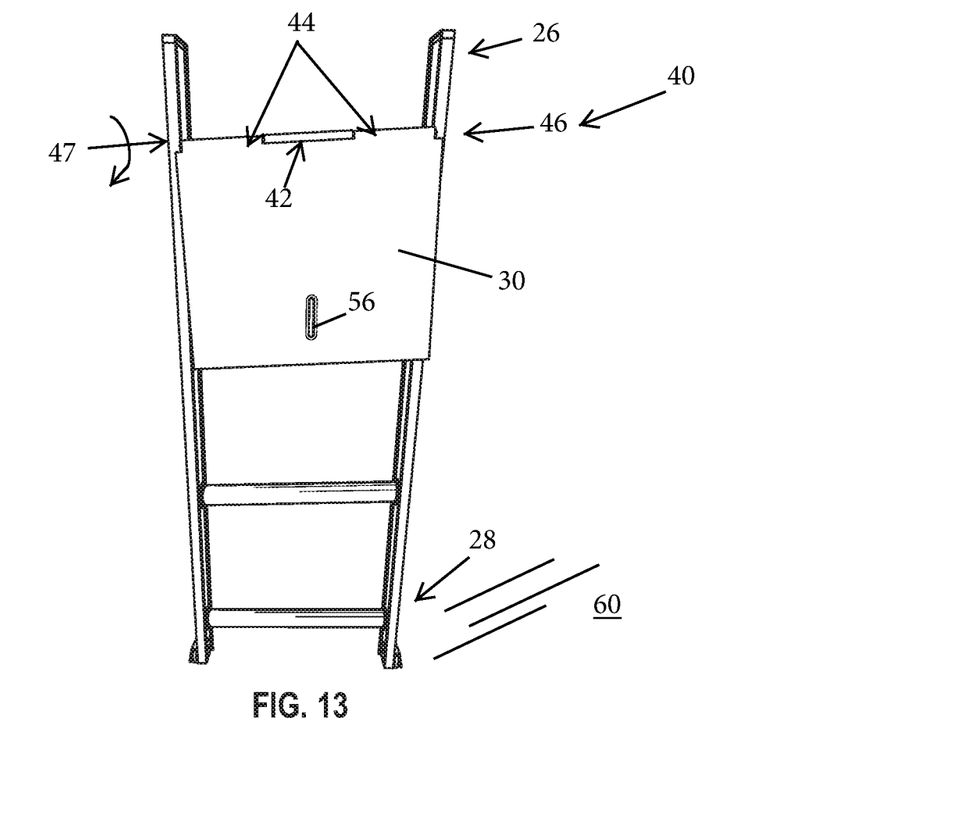
FIG. 13 is a back-side view of the swiveling drop ladder of FIG. 12 and with the swiveling plate rotated down via a hinge between the swiveling drop ladder and the swiveling plate in accordance with an embodiment of the present invention.
Figure 14:
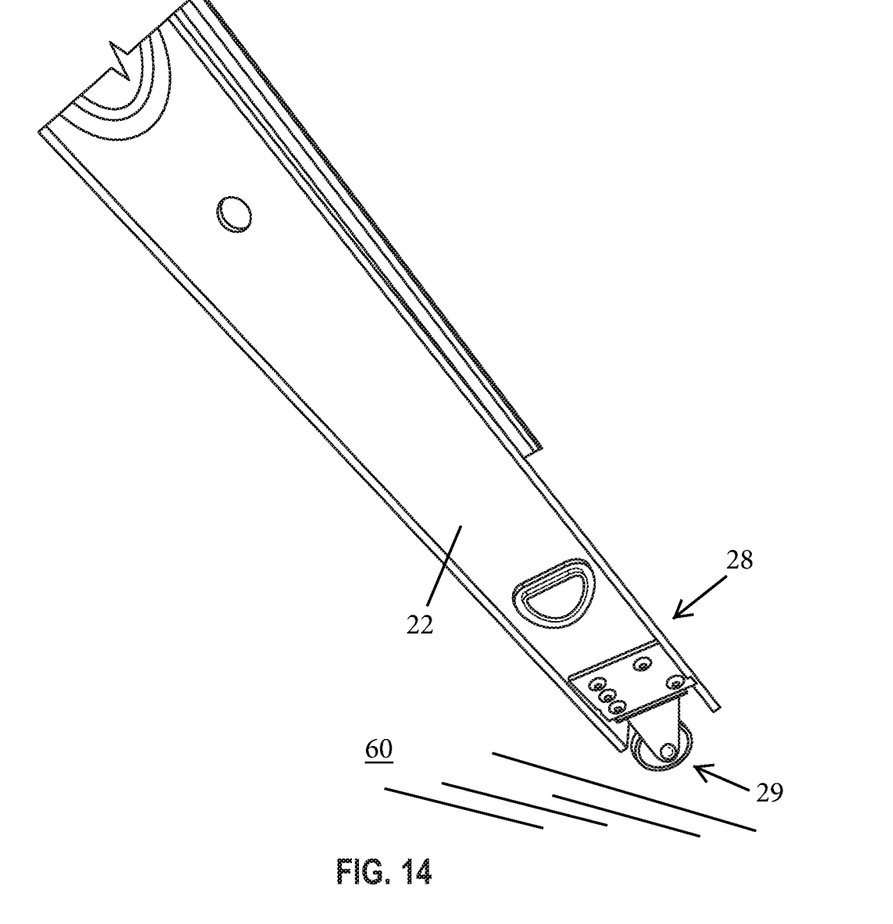
FIG. 14 is a left-side view of a bottom portion of the swiveling drop ladder of FIG. 1 illustrating wheels affixed to the ends of the swiveling drop ladder in accordance with an embodiment of the present invention.

Referring now to the drawings and the illustrative embodiments depicted therein, an exemplary swiveling drop ladder 10 is illustrated in FIGS. 1-4. Embodiments of the present invention provide for a swiveling drop ladder 10 that includes a ladder 20 rotationally coupled to a vehicle tailgate 50 via a swivel plate 30. Such embodiments of a swiveling drop ladder 10 can be coupled to a vehicle tailgate 50 and deployed as desired to allow for easy access to space within the vehicle, such as a pickup truck bed. In a first embodiment, the swiveling drop ladder 10 includes a ladder 20 and a swiveling plate 30. The ladder 20 and a swiveling plate 30 are coupled together via a hinge assembly 40 (see FIGS. 12 and 13). A first portion 42 of the hinge assembly 40 is affixed to the ladder 20. A second portion 44 of the hinge assembly 40 is formed from a portion of the swiveling plate 30. The first portion 42 and the second portion 44 of the hinge assembly 40 are rotationally joined together via a hinge bolt 46. FIGS. 1 and 2 provide perspective views of the swiveling drop ladder 10 installed upon an inner surface of a vehicle tailgate 50, and with the tailgate 50 in a closed position and open position, respectively. FIG. 8 provides a left-side view of the swiveling drop ladder 10 installed upon the vehicle tailgate 50. As described herein, the swiveling drop ladder 10, when mounted upon the vehicle tailgate 50, is configured to rotate between a first, stowed position and a second, deployed position (see FIGS. 3-5). In a stowed position, illustrated in FIGS. 1-3 and 8, the swiveling drop ladder 10 is retained against the vehicle tailgate 50. As illustrated in FIGS. 3-5, the swiveling drop ladder 10 may be deployed from a stowed position by rotating about an axis 32 of the swiveling plate 30, such that the ladder 20 substantially extends off the vehicle tailgate 50. FIGS. 6 and 7 illustrate the swiveling drop ladder 10 extending off the vehicle tailgate and rotated about an axis 47 of the hinge bolt 46 to angle down to the ground 60. FIG. 10 illustrates a threaded opening 57 in an interior portion of the vehicle tailgate 50 and through which the swiveling plate 30 of the ladder 20 is affixed to the tailgate 50. FIG. 11 illustrates the swiveling plate 30 of the ladder 20 affixed to the tailgate 50 via a bolt inserted through a slot in the swiveling plate 30 to enter the threaded opening 57 in the tailgate 50. FIGS. 12 and 13 illustrate the operation of the hinge assembly, which allows the swivel plate 30 to rotate from a vertical position about an axis to rest against the rails 22 of the ladder 20. Lastly, FIG. 14 illustrates the position and operation of the wheels mounted onto the ends of the rails 22 of the ladder 20.

Figure 9:
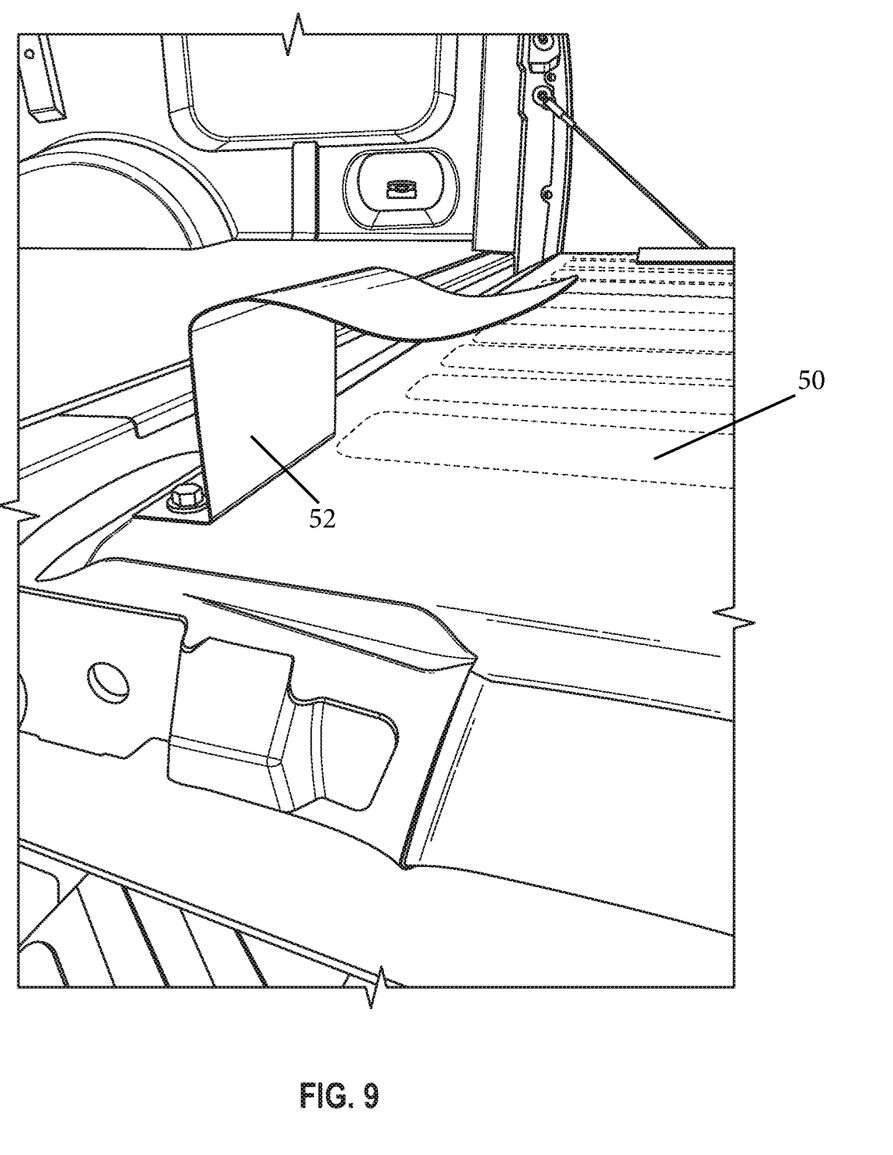
FIG. 9 is a left-side perspective view of the retainer of FIG. 8 in accordance with an embodiment of the present invention.

An exemplary ladder 20 includes a pair of rails 22 with a plurality of steps (which may be referred to as rungs) 24 attached between the rails 22. While FIGS. 1-2 illustrate four steps 24 positioned between the rails 22, any number of steps 24 may be positioned between the rails 22. In one embodiment, the ladder 20 includes a top cap at a top portion of the ladder rails 22 and an end cap at a bottom portion of the ladder rails (not shown). The rails 22 and steps 24 of the ladder 20 may be formed of metallic materials (e.g., aluminum, steel, and alloys), reinforced polymeric materials, fiberglass materials, other materials, or a combination of such materials. In one embodiment, the rails 22 and steps 24 have an aluminum construction. In another embodiment, the rails 22 have a polymeric or fiberglass construction, while the steps 24 have an aluminum construction. The rails 22 may be parallel to each other, or in the alternative, the rails 22 may be angled with respect to each other such that a spacing between the distal ends 28 of the rails 22 is different from a spacing between the proximal ends 26 of the rails 22. As illustrated in FIGS. 1, 3-5, 6, 8, and 14, the distal ends 28 of the rails 22 are equipped with wheels 29. The wheels 29 are positioned to allow the distal ends 28 of the ladder 20 to adjust its position upon the ground 60 to adapt to a changing height of the tailgate 50 with respect to the ground 60 (see FIGS. 6 and 9). Optionally, the wheels 29 may be mounted to an end cap, which is discussed herein. As noted above, in embodiments that do not include an end cap, and as illustrated in FIG. 14, the wheels 29 are mounted to the distal ends 28 of the rails 22.

FIGS. 1, 2, and 8 illustrate the swiveling drop ladder 10 in a first, stowed position upon the vehicle tailgate 50. When in the first, stowed position, the swiveling drop ladder 10 is held in position upon the vehicle tailgate 50 by a retaining bracket 52 that is mounted to the vehicle tailgate 50. The retaining bracket 52 is configured to grasp and retain a rail 22 of the ladder 20, such that the ladder 20 is unable to rotate about the axis 32 of the swiveling plate 30. While FIG. 1 illustrates the tailgate 50 in a closed position, FIGS. 2 and 8 illustrate the swiveling drop ladder 10 resting upon the tailgate 50 when the tailgate is in an open position.

As illustrated in FIG. 12, the first portion 42 of the hinge assembly 40 is affixed to the rails 22 of the ladder 20. In one embodiment, the first portion 42 is affixed to the rails 22 with sets of nuts and bolts 48. In another embodiment, the first portion 42 is affixed to the rail 22 via welding or other similar affixing methods. As illustrated in FIGS. 11-13, a distal portion of the first portion 42 is rolled to form a first part of a hinge 46. In one embodiment, the hinge 46 is a single hinge that extends along an edge of the first portion 42 (see FIGS. 11-13). In another embodiment, the hinge 46 comprises a plurality of hinges arranged along the edge of the first portion 42.

As illustrated in FIGS. 11-13, the second portion 44 of the hinge assembly 40 is formed from a portion of the swiveling plate 30. In an embodiment illustrated in FIGS. 11-13, the second portion 42 of the hinge assembly 40 is formed by rolling at least a portion of an edge of the swiveling plate 30. Optionally, the second portion 42 of the hinge assembly 40 is separate from the swiveling plate 30 and is affixed to the swiveling plate 30 via nuts and bolts or welding methods.

FIGS. 7, 10, and 11 illustrate the swiveling plate 30 positioned upon the vehicle tailgate 50. The swiveling plate 30 is bolted 54 to the vehicle tailgate 50 via an opening 56 in the swiveling plate 30 and inserted into and retained in a threaded opening 57 in the vehicle tailgate 50. As illustrated in FIG. 11, the opening 56 may have an elongate shape (a "slot") allowing for the swiveling plate 30 (and the affixed ladder 20) to be adjusted longitudinally. This longitudinal adjustment feature may be useful in adjusting the position of the swiveling drop ladder 10 with respect to an edge of the vehicle tailgate 50, such that an axis 47 of the hinge 46 is positioned with respect to the edge of the vehicle tailgate 50 when the swiveling drop ladder 10 is transitioned to the deployed position (see FIGS. 3-7).

FIGS. 6, 7, and 11 illustrate the swiveling drop ladder 10 in a second, deployed position upon the vehicle tailgate 50. When in the second, deployed position, the swiveling drop ladder 10 has been rotated upon the axis 32 of the bolt 54 such that the swiveling plate 30 has been rotated 90 degrees with respect to its stowed position. As illustrated in FIG. 11, when in the second, deployed position, the swiveling plate 30 has been rotated (via axis 32) such that an edge of the second portion 42 of the hinge assembly 40 is aligned with respect to an edge of the vehicle tailgate 50. Optionally, the edge of the second portion 42 of the hinge assembly 40 is aligned with the edge of the vehicle tailgate 50. As illustrated in FIGS. 6, 7, and 11, when the edge of the second portion 42 of the hinge assembly 40 is aligned with respect to the edge of the vehicle tailgate 50, the axis 47 of the hinge 46 is also aligned with respect to the edge of the vehicle tailgate 50. To align the edge of the second portion 42 of the hinge assembly 40 with respect to the edge of the vehicle tailgate 50, the swiveling plate 30 may also be longitudinally adjusted via the elongated opening 56.

As illustrated in FIGS. 6 and 7, when the swiveling drop ladder 10 has been rotated to the second, deployed position, the ladder 20 (affixed to the first portion 44 of the hinge assembly 40) rotates downward with respect to the vehicle tailgate 50 to contact the ground 60. As illustrated in FIGS. 6, 7, and 14, when the swiveling drop ladder 10 has been rotated to the second, deployed position, the distal ends 28 of the rails 22 contact the ground. As discussed herein, and illustrated in FIGS. 3 and 4, the distal ends 28 of the rails 22 include a pair of wheels 29 that are positioned to allow the distal ends 28 of the rails 22 to adjust their position upon the ground 60. That is, the distal end 28 of the ladder 20 adapts to a changing height of the tailgate 50 with respect to the ground 60. Optionally, the pair of wheels 29 may be mounted to an end cap that is mounted at the distal ends 28 of the ladder 20. Depending on the terrain, the distance between the ground 60 and the vehicle tailgate 50 may vary. Furthermore, the distance between the ground 60 and the vehicle tailgate 50 may further vary as cargo is placed into the bed and weights down the back of the vehicle. Additionally, when a user is standing on the vehicle tailgate 50, after climbing up the ladder 20, the distance between the vehicle tailgate 50 and the ground 60 may be further reduced. This wheel-assisted adjustment allows the ladder 20 to adapt to the changing height distance and prevents the ladder 20 from getting wedged between the vehicle tailgate 50 and the ground 60 such that the swiveling drop ladder 10 would be bound in the second, deployed position. The wheels 29 also prevent damage to components of the swiveling drop ladder 10 when additional weight is applied to the truck bed and/or the vehicle tailgate 50, by allowing the ladder 20 to shift position. The operation of the wheels 29 discussed herein is quite different from the majority of ladder-mounted wheels. In most typical wheel-equipped ladders, the wheels are configured to retract when weight is placed upon the ladder, allowing the ladder to firmly rest upon the ground. That is, conventional wheel-equipped ladders are configured to roll upon their wheels when moving the ladder, but are configured to retract when used. In contrast, exemplary wheels 29 of the present invention do not retract and allow the ladder to shift in position as the height difference between the vehicle tailgate 50 and the ground 60 changes.

In further embodiments, the swiveling drop ladder 10 may be optionally equipped with one or more handrails to aid a user in climbing into the vehicle tailgate 50. For example, the handrails could be positioned on one or both rails 22.

Therefore, as discussed herein, embodiments of the swiveling drop ladder 10 are configured such that to move the swiveling drop ladder 10 from the stowed position to the deployed position, a user frees the ladder 20 from the retaining bracket 52 and rotates the ladder 20 about the axis 32 of the swiveling plate 30 until the ladder 20 is extending out from the vehicle tailgate 50. The ladder 20 will need to be supported during this rotation to maintain control of the ladder 20 as it extends out past the vehicle tailgate 50. After rotating the ladder 20 about the axis 32 of the swiveling plate 30, the ladder 20 may then be rotated downward about the axis 47 of the hinge assembly 40, such that the ladder 20 angles downward to touch the ground 60. This step is also performed by the user, supporting the ladder 20 during this rotation of the ladder 20 towards the ground 60. These steps are repeated in reverse order to return the ladder 20 to the stowed position. That is, the ladder 20 is lifted to rotate the ladder about the axis 47 of the hinge assembly 40, such that the ladder 20 extends from the vehicle tailgate on a same plane. Then, the ladder 20 is rotated about the axis 32 of the swiveling plate to return the swiveling drop ladder 10 to the stowed position.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments. Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A swiveling drop ladder configured for mounting to a vehicle tailgate, the swiveling drop ladder comprising:
   a ladder and a swiveling plate, wherein the ladder and the swiveling plate are coupled together via a hinge assembly, wherein the hinge assembly comprises a first portion affixed to the ladder and a second portion formed from a portion of the swiveling plate, and wherein the first portion and the second portion are rotationally joined together to form a first axis of the hinge assembly;
   wherein the swiveling plate is rotationally mounted on a vehicle tailgate via a first bolt which provides a second axis of the swiveling plate, wherein the swiveling plate is configured to provide for a first rotation of the ladder from a stowed position upon the vehicle tailgate to a deployed position when the swiveling plate is rotated about the second axis, and wherein the ladder extends off the back of the vehicle tailgate when in the deployed position; and
   wherein the hinge assembly is configured to provide for a second rotation of the ladder at the first axis when in the deployed position, such that the ladder extending off the vehicle tailgate also angles down to touch the ground.

2. The swiveling drop ladder of claim 1, wherein the ladder is retained upon an interior surface of the vehicle tailgate when in the stowed position.

3. The swiveling drop ladder of claim 1 further comprising a retaining bracket configured to retain the ladder in the stowed position.

4. The swiveling drop ladder of claim 1, wherein the swiveling plate is mounted to the vehicle tailgate via an opening in the swiveling plate, wherein the first bolt passes through the opening, wherein the first rotation of the swiveling plate rotates the swiveling plate about the second axis at the opening, and wherein the opening is an elongated opening configured to provide for a longitudinal movement of the swiveling plate.

5. The swiveling drop ladder of claim 1, wherein the first portion of the hinge assembly and the second portion of the hinge assembly are configured with rolled edge portions that form respective rolled portions of the hinge assembly, and wherein the rolled portions of the hinge assembly are rotationally joined together via a second bolt inserted into the rolled portions.

6. The swiveling drop ladder of claim 5, wherein the second portion of the hinge assembly, when in the deployed position, rests upon the surface of the vehicle tailgate and is aligned with respect to an edge of the vehicle tailgate, and wherein the first portion of the hinge assembly, when in the deployed position, rotates about the hinge, such that the ladder rotates about the hinge and angles downward to touch the ground.

7. The swiveling drop ladder of claim 5, wherein the rolled portions of the hinge assembly form a butt hinge.

8. The swiveling drop ladder of claim 5, wherein the rolled portions of the hinge assembly define one or more hinges.

9. The swiveling drop ladder of claim 1, wherein a distal end of the ladder comprises a pair of wheels, and wherein the wheels are configured to roll upon the ground when the ladder contacts the ground, such that the ladder slides along the ground in response to changing heights between the vehicle tailgate and the ground.

10. The swiveling drop ladder of claim 1, wherein the ladder, the swiveling plate, and the hinge assembly are formed of at least one of aluminum and reinforced polymeric material.

11. The swiveling drop ladder of claim 1, wherein the ladder comprises a pair of rails with a plurality of steps attached between the rails.

12. The swiveling drop ladder of claim 1 further comprising hand rails, wherein the hand rails are positioned on at least one side of the ladder.

13. A method for rotating a ladder, mounted to a vehicle tailgate, between a stowed position and a deployed position, the method comprising:
affixing a ladder to a swiveling plate via a hinge, wherein the hinge comprises a first portion affixed to the ladder and a second portion formed from a portion of the swiveling plate, and wherein the first and second portions are rotationally joined together to form a first rotational axis of the hinge;
mounting the swiveling plate to the vehicle tailgate via a bolt which provides a second rotational axis of the swiveling plate;
rotating the swiveling plate about the second axis to rotate the ladder from the stowed position upon the vehicle tailgate to a deployed position, wherein the ladder extends off the back of the vehicle tailgate when in the deployed position; and
rotating the hinge about the first axis to further rotate the ladder when in the deployed position, such that the ladder extending off the vehicle tailgate also angles down to touch the ground.

14. The method of claim 13 further comprising retaining the ladder upon an interior surface of the vehicle tailgate when in the stowed position.

15. The method of claim 14 further comprising providing a retaining bracket configured to retain the ladder in the stowed position.

16. The method of claim 13, wherein the swiveling plate is mounted to the vehicle tailgate via an opening in the swiveling plate, wherein the bolt passes through the opening, wherein rotating the swiveling plate about the second axis comprises rotating the swiveling plate about the second axis at the opening, and wherein the opening is an elongated opening configured to provide for a longitudinal movement of the swiveling plate.

17. The method of claim 13, wherein the ladder rotates about the hinge to angle downward to touch the ground.

18. The method of claim 13, wherein the hinge comprises one or more hinges, and wherein the one or more hinges are butt hinges.

19. The method of claim 13 further comprising a pair of wheels mounted to a distal end of the ladder, wherein the wheels are configured to roll upon the ground when the ladder contacts the ground, such that the ladder moves along the ground in response to changing heights between the vehicle tailgate and the ground.

20. The method of claim 13 further comprising providing the ladder with hand rails, wherein the hand rails are positioned on at least one side of the ladder, wherein the ladder, the hand rails, the swiveling plate, and the hinge are formed of at least one of aluminum and reinforced polymeric material.

\* \* \* \* \*